Nov. 22, 1949 — L. L. REX — 2,488,684
CHAIN SAW FILING GAUGE
Filed May 7, 1948

INVENTOR.
Lindsey L. Rex
BY Victor J. Evans & Co.
ATTORNEYS

Patented Nov. 22, 1949

2,488,684

UNITED STATES PATENT OFFICE 2,488,684

CHAIN SAW FILING GAUGE

Lindsey L. Rex, Cottage Grove, Oreg.

Application May 7, 1948, Serial No. 25,603

3 Claims. (Cl. 33—202)

This invention relates to chain saw filing gages and jointers for gaging the teeth of chain saws, and in particular an arcuate arm having a shank by which it is held in a socket extending from the upper edge of a side plate with adjusting screws in the side plate and arcuate arm and lock nuts on the said screws.

The purpose of this invention is to provide means for accurately gaging the cutting teeth of chain saws that may readily be adjusted to teeth of different sizes and designs.

It is difficult to gage the teeth of chain saws because the saws are provided in numerous different sizes and the teeth are of various designs. With this thought in mind this invention contemplates a chain saw tooth gage wherein a side plate forming the base of the gage and also the teeth engaging elements thereof may readily be adjusted.

The object of this invention is, therefore, to provide a chain saw gage that may readily be adjusted to a plurality of points to a template or master tooth, so that all of the other teeth in the saw may be filed or formed to correspond therewith.

Another object of the invention is to provide a gage for teeth of chain saws having a tooth engaging element mounted on a base wherein the tooth engaging element may be adjusted longitudinally of the base.

Another object of the invention is to provide a chain saw tooth gage that may readily be adjusted in the woods as well as in the shop.

A further object of the invention is to provide a saw tooth gage and jointer for teeth of chain saws in which substantially all of the parts are adjustable, which is of a simple and economical construction.

With these and other objects and advantages in view the invention consists of the new and useful combination, construction, and arrangement of parts as hereinafter more fully described, set forth in the claims appended hereto and disclosed in the accompanying drawings forming part hereof, wherein:

Figure 1:
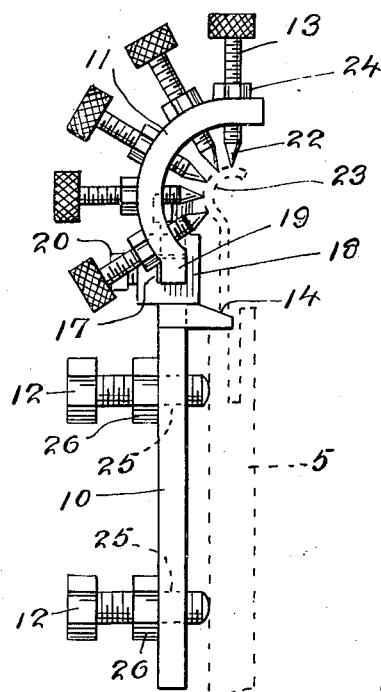
Figure 1 is a view showing an end elevation of the gage with a bar of a chain saw and a tooth thereof indicated in dotted lines.

Referring now to the drawings wherein like reference characters denote corresponding parts the chain saw tooth gage and jointer of this invention is formed with a sideplate 10, an arcuate arm 11, adjusting screws 12, in the side plate, and pointed thumb screws 13 in the arm.

Figure 2:
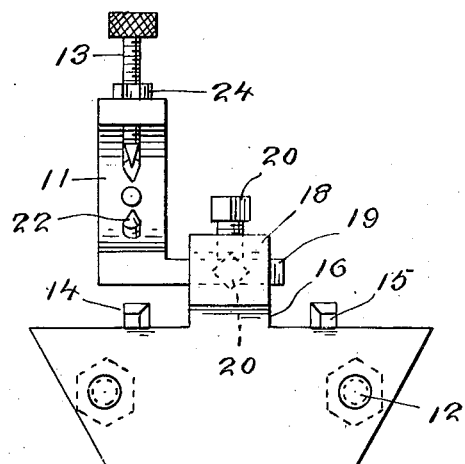
Figure 2 is a view showing a front elevation of the gage.
Figure 3:
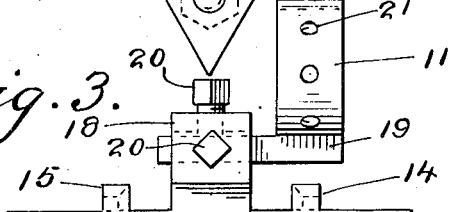
Figure 3 is a similar view looking toward the opposite side of the gage.
Figure 4:
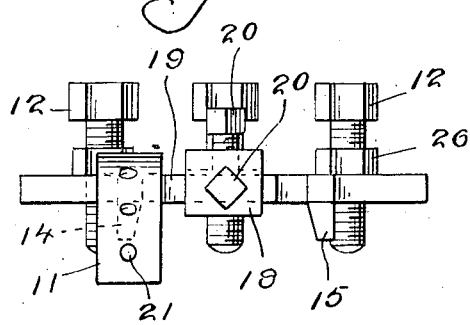
Figure 4 is a plan view of the gage.

In the design shown the side plate 10 is triangular-shaped and the upper edge is provided with bar guides 14 and 15 that extend over and rest upon the upper edge of the chain link bars 5 which are indicated in dotted lines, as shown in Figure 1. The upper edge of the side plate is also provided with an extension 16 having a socket 17 in a hub 18 on the upper end, and a shank 19 extending laterally from the lower end of the arcuate arm 11 is held in the socket by set screws 20, as shown in Figure 2.

The thumb screws 13 are threaded in openings 21 at spaced intervals in the arcuate arm wherein points 22 thereon may engage saw teeth 23 at a plurality of points, so that each part of the surface of the tooth may be duplicated on all teeth in the saw. It will be understood that the screws may be of any suitable size and as many screws as may be desired may be used. Each screw is provided with a lock nut 24 whereby it is retained in the set position. The position of the arcuate arm in relation to the side plate is also adjustable through the shank 19 and set screw 20.

The adjusting screws 12 are threaded in openings 25 in the side plate, and these are also provided with lock nuts 26 by which they are retained in adjusted positions after the side plate is set parallel to the chain bar and the arcuate arm in registering position with the teeth.

The arcuate arm 11 may readily be removed and replaced with arms of different sizes for different size saws.

It will be understood that modifications may be made in the design and arrangement of the parts without departing from the spirit of the invention.

What is claimed is:

1. A chain saw tooth gage comprising a side plate having bar guides extending from the upper edge and an extension with a hub having a socket therethrough at the upper end, adjusting screws with lock nuts thereon threaded in said side plate, an arcuate arm having a laterally extending shank on the lower end positioned above the side plate with the shank in the socket of the hub of the side plate, a set screw securing the shank in the socket, and a plurality of thumb screws with lock nuts thereon threaded in said arcuate arm and having points positioned to contact the outer arcuate surface of a saw tooth.

2. A chain saw tooth gage comprising a base plate having an upper edge and adapted to be positioned against the side of a bar of the chain, means adjusting the base plate in relation to the chain, said base plate having fingers extending from the upper edge perpendicular to the face thereof providing bar guides, an arcuate arm adjustably mounted on the upper edge of the said base plate, and tooth contacting elements adjustably mounted in spaced relation in said arcuate arm.

3. In a chain saw tooth gage, a triangular-shaped base plate having an upper edge, said base plate having bar guides and a hub with a socket therethrough extending from the upper edge, an arcuate arm having a shank positioned in the socket of the hub extending from the upper edge of the base plate, means adjustable securing the shank in the socket, adjusting means in the base plate, and tooth engaging elements adjustably mounted in said arcuate arm.

LINDSEY L. REX.

REFERENCES CITED

The following references are of record in the file of this patent:

UNITED STATES PATENTS

| Number | Name | Date |
| --- | --- | --- |
| 941,297 | Barthelmes | Nov. 23, 1909 |
| 1,023,341 | Sullivan | Apr. 16, 1912 |
| 1,373,719 | Gibbs | Apr. 5, 1921 |
| 2,415,137 | Johnson | Feb. 4, 1947 |
| 2,438,687 | Stone | Mar. 30, 1948 |